United States Patent [19]

Ali-Khan et al.

[11] Patent Number: 4,494,965
[45] Date of Patent: Jan. 22, 1985

[54] DEVICE UTILIZED FOR SEPARATION OF HYDROGEN ISOTOPES FROM A GAS MIXTURE FOR SEPARATION OF ISOTOPES CONTAINED IN A HYDROGEN ISOTOPE MIXTURE

[75] Inventors: Imran Ali-Khan, Jülich, Fed. Rep. of Germany; Karl-Jürgen Dietz, East hendred, England; Francois Waelbroeck; Peter Wienhold, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 430,042

[22] Filed: Sep. 30, 1982

Related U.S. Application Data

[63] Continuation of Ser. No. 310,076, Oct. 9, 1981, abandoned, which is a continuation-in-part of Ser. No. 104,863, Dec. 18, 1979, abandoned.

[30] Foreign Application Priority Data

Nov. 15, 1979 [DE] Fed. Rep. of Germany ....... 2854682

[51] Int. Cl.³ ............................................. B01D 53/22
[52] U.S. Cl. ......................................... 55/16; 55/158; 55/208
[58] Field of Search .......................... 55/16, 158, 208; 423/648 R, DIG. 7

[56] References Cited

U.S. PATENT DOCUMENTS

| | | | |
|---|---|---|---|
| 1,174,631 | 3/1916 | Snelling | 55/158 |
| 2,032,925 | 3/1936 | Ferguson | 423/648 R |
| 2,456,163 | 12/1948 | Watson | 55/158 X |
| 2,609,059 | 9/1952 | Benedict | 55/16 |
| 2,671,337 | 3/1954 | Hulsberg | 55/158 X |
| 2,824,620 | 2/1958 | De Rosset | 55/16 |
| 2,986,641 | 5/1961 | Michels | 55/158 X |
| 3,104,960 | 9/1963 | Chamberlin et al. | 55/158 |
| 3,241,298 | 3/1966 | Pierce | 55/16 X |
| 3,251,173 | 5/1966 | Ehlers et al. | 55/158 |
| 3,344,582 | 10/1967 | Merrill et al. | 55/16 |
| 3,407,571 | 10/1968 | Sherwood | 55/158 |
| 4,119,418 | 10/1978 | Smid | 55/158 |

FOREIGN PATENT DOCUMENTS

| | | |
|---|---|---|
| 733079 | 3/1943 | Fed. Rep. of Germany ........ 55/158 |
| 1235358 | 5/1960 | France . |
| 1240085 | 7/1960 | France . |
| 1317331 | 1/1963 | France . |
| 936421 | 9/1963 | United Kingdom . |

OTHER PUBLICATIONS

A. S. Darling, Chemie-Ingenieur-Technik, No. 1, pp. 18-27, 1965.
Ullmanns Encyklopädie der Technischen Chemie 4, Aufl.BD 2, pp. 624-626.

*Primary Examiner*—Robert H. Spitzer
*Attorney, Agent, or Firm*—Becker & Becker, Inc.

[57] ABSTRACT

An apparatus utilized for separating hydrogen isotopes from a gas mixture to separate isotopes contained in a hydrogen isotope mixture. The apparatus is provided with two chambers closable by valves and surrounded on all sides by walls and separated from each other by a wall or partition of material differing from palladium though permeable preferably for atomic hydrogen and permeable only to a lesser extent for molecular hydrogen. One of the chambers is connected with a gas supply line as well as a gas discharge line, and the other chamber, provided for collecting isotope mixture coming through the permeable wall, is capable of being evacuated. The remaining walls of the chambers consist of material which is not or is only poorly permeable for hydrogen isotopes. In the chamber connected with the gas supply line and gas discharge line, there is arranged a device for conversion of molecular hydrogen into atomic hydrogen for separation of isotopes contained in the hydrogen isotope mixture as well as, as the case may be, for the compression thereof. Multiple devices or apparatus of the present invention can be electrically operated independently of the walls or partition and can be connected sequentially in a cascade form.

13 Claims, 1 Drawing Figure

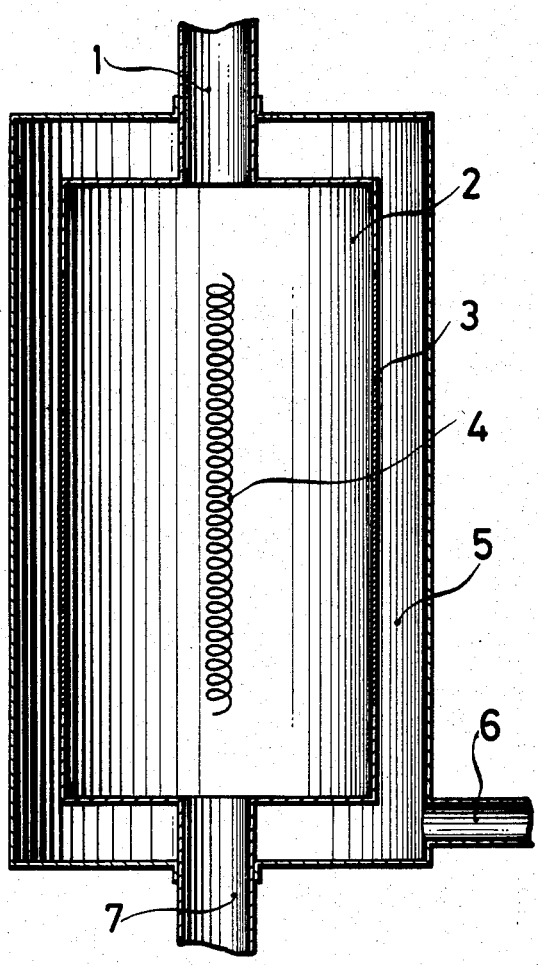

DEVICES UTILIZIED FOR SEPARATION OF HYDROGEN ISOTOPES FROM A GAS MIXTURE FOR SEPARATION OF ISOTOPES CONTAINED IN A HYDROGEN ISOTOPE MIXTURE

This is a continuation application of Ser. No. 310,076 filed Oct. 9, 1981, which is a Continuation-in-part application of Parent application Ser. No. 104,863/Ali Khan filed Dec. 18, 1979, both now abandoned.

The present invention concerns an apparatus or device with two chambers closable by valves and surrounded on all sides by walls and separated from each other by a wall permeable for atomic hydrogen and permeable only to a lesser extent or measure for molecular hydrogen. One of the chambers is connected with a gas supply line as well as a gas discharge line, and the other chamber provided for catching or collecting the isotope mixture passing through the permeable wall is capable of being evacuated, while the remaining walls of the chambers consist of a material not permeable or poorly permeable for hydrogen isotopes. In the chamber connected with the gas supply line and the gas discharge line there is arranged another device for converting of molecular hydrogen into atomic hydrogen for separation of isotopes contained in the hydrogen isotope mixture and suitably for the compression thereof.

Such an apparatus, however, is provided for separation of a hydrogen isotope mixture from a gas mixture in which this isotope mixture is contained.

It is advantageous to utilize the apparatus for the inventive purpose in an embodiment which uses as device for conversion into atomic hydrogen a thread, wire or body of other form of high melting material, such as wolfram or tungsten, iridium, osmium, rhenium, capable of being heated to a temperature above 1500 K. The wall preferably permeable for atomic hydrogen is capable of being heated to a temperature in the range of from 400 to approximately 800 K. The permeable wall consists preferably of iron as, for example, $\alpha$-iron, steel, as for example a steel of the composition ST 60 or an austenitic steel, or nickel, or also a nickel-base alloy. Advantageous is furthermore the utilization of the apparatus in an embodiment with which the chambers are arranged coaxial with respect to each other, while the difficult-to-melt thread, wire or body with other form is provided in the common axis of the chambers, and the permeable wall is embodied as a hollow cylinder surrounding the body of high-melting material with spacing therefrom.

There are moreover already known methods for separation of a hydrogen isotope from a hydrogen isotope mixture. With this known method the isotope separation occurs by mass separation by means of particle accelerators or by fractionated distillation or electrolysis of water, heavy water or very heavy water. Disadvantageous with these measures or features belonging to the state of the art is, however, that it is not possible to undertake a separation of isotopes directly from a gaseous isotope mixture. Disadvantageous furthermore is that a compression of the separated or enriched isotope is necessary for most cases of utilization. This makes necessary the subsequent connection of a further method stage, whereby for the situation, that compressors with movable parts are used for this purpose, the danger is added for contamination by residual oil as a consequence of the necessary lubrication of these movable parts.

By means of the methods known up to now it is also not possible, as is frequently necessary, for example, to separate tritium from the cooling circuit of a gas-cooled high-temperature reactor or from the fuel circuit of a fusion reactor.

It is an object of the present invention to avoid these disadvantages and to make possible the separation of a hydrogen isotope and enrichment thereof from a gaseous hydrogen isotope mixture and consequently to embody the separation and enrichment of hydrogen isotopes in a hydrogen isotope mixture in a manner more economical than has been possible up to now.

It is another object of this invention, without additional devices or apparatus, to make possible the compression of the separated isotopes or the enriched isotope mixture.

The inventively provided apparatus for utilization in accordance with the present invention is based upon the recognition that, as a consequence of the different masses of the isotopes of hydrogen after disassociation, the hydrogen atoms flow upon the wall permeable preferably for atomic hydrogen is different even with the same partial pressures of the isotopes, this flow being more intense for the lighter atoms. With the generally different partial pressure of the isotopes of hydrogen isotope mixture, this likewise leads to a relatively enhanced arrival of lightweight atoms at the wall wherein these lightweight atoms diffuse more quickly than the heavier ones which additionally favors the isotope separating effect.

In case the hydrogen isotopes within the mixture all have the same or also different pressures there has further become evident, independently thereof whether the partial pressures either all lie above or whether they all lie below $10^{-3}$ mbar, that as a consequence of the arrangement of the device after disassociation of the molecules of the hydrogen isotope mixture the throughput through the wall permeable preferably for atomic hydrogen is increased at least by 100 times over the permeation attainable when using the previously known devices or apparatus. Consequently it is either possible, with a device or apparatus having the same size as the previously known devices or apparatus, to increase considerably the throughput or, with identical throughput, to reduce considerably the size of the apparatus used for isotope separation and enrichment according to the invention.

In order to obtain a very extensive separation of an isotope from a hydrogen isotope mixture in continuous operation, an advantageous embodiment of the device for the inventive utilization purpose consists therein that several of these devices or apparatus are connected serially in a cascade form.

The objects and advantages of the present invention will appear more clearly from the following specification in connection with the accompanying drawing which illustrates schematically an apparatus having features in accordance with the present invention.

With the sample embodiment of the apparatus for the present inventive utilization purpose there is preferably used an arrangement of the device with which the hydrogen isotope mixture is introduced through a supply line 1 closable by a valve, not shown in the drawing, into a chamber 2 capable of being closed on all sides. The chamber 2 is embodied cylindrically whereby a part of the cylinder wall 3 is permeable for hydrogen atoms. In the axis of the cylindrical chamber 2 there is arranged a thread or wire 4 of a high-melting material as, for example, wolfram or tungsten; the length of the thread or wire 4 corresponds to the length of that part of the wall of the cylinder which is permeable for atomic hydrogen. The thread or wire 4 is capable of being heated to a temperature in a range up to approximately 2000 K. by a heating device not illustrated in the drawing. The cylindrical chamber 2 is coaxially surrounded by a chamber 5. The chamber 5 is provided for catching or collecting hydrogen which is contained in molecular form in the hydrogen isotope mixture, thereupon is converted into atomic hydrogen by means of the wolfram or tungsten thread or wire 4 and, after the passage through the part 3 of the wall of the cylindrical chamber 2 permeable preferably for atomic hydrogen, undergoes a transition into the molecular form.

As recognizable from the drawing, the hydrogen isotope mixture introduced through the supply line 1 into the cylindrical chamber 2 passes the wire or thread 4 of wolfram or tungsten. The molecular hydrogen contained in the introduced hydrogen isotope mixture is thereby converted into atomic hydrogen and, after penetrating the wall permeable preferably for atomic hydrogen, is collected in the chamber 5. The hydrogen remains in the chamber 5 after recombination respectively of two hydrogen atoms into hydrogen molecules. The chamber 5 is capable of being connected to a device for evacuation, not illustrated in the drawing. The hydrogen is then withdrawn from the chamber 5 by way of a discharge conduit 6 after it has attained a predetermined pressure. The isotope mixture remaining after passing the thread or wire 4 of wolfram or tungsten is withdrawn from the chamber 2 by way of a discharge conduit 7 connected with the chamber 2 and capable of being closed off by a valve, not illustrated in the drawings, so that the apparatus according to the invention can be operated continuously by way of continuous feeding or supplying and discharging of the hydrogen isotope mixture from which the separation of hydrogen isotope is to occur. The pressure of the hydrogen gas in the chamber 5 thus can consequently be increased up to a level or height sufficient for numerous application or utilization purposes.

Sample Embodiment

A hydrogen isotope mixture consisting of deuterium and 0.1% tritium is introduced into a previously evacuated chamber of the present inventive apparatus. Hereby the isotope mixture is at a pressure of 1 mbar, and a wolfram or tungsten thread with a total upper surface of 0.3 cm$^2$ is heated to a temperature of 2000 K. at a power of approximately 15 W; and there is used a wall of α-iron with a thickness of approximately 1 mm and a total surface of 100 cm$^2$ which is heated to a temperature of 2000 K. and is permeable preferably for atomic hydrogen. Accordingly, after an operating duration of eight hours the equilibrium condition for the partial pressures of deuterium and tritium is attained in the catching or collecting chamber 5 having a volume of 0.1 liters. The partial pressures then amount to 340 mbar for deuterium and 0.28 mbar for tritium.

By way of repeated operation or cascade-like sequential connection of several devices or apparatus in accordance with the present inventive purpose, there can be attained a suitably accurate separation of tritium from deuterium.

Reference can be made to a German application No. P 28 54 638.5-41 corresponding to U.S. application Ser. No. 104,734-Ali-Khan et al, filed Dec. 18, 1979 concurrently herewith, for further details and disclosure pertinent to the present invention.

A U.S. Pat. No. 3,407,571-Sherwood issued in October 1968 discloses an apparatus for separation of hydrogen in which only the open spaces with the known apparatus are closed-off on both sides by way of a hydrogen-permeable membrane.

Actually the Sherwood U.S. Pat. No. 3,407,571 teaches the utilization of a separating wall or membrane of a material which is very well permeable for an atomic hydrogen though however being practically impermeable for molecular hydrogen and the separating wall or membrane can comprise for example conventional steel. Additionally, such a membrane comprising mechanically solid and relatively inexpensive or moderately priced material providing a separating wall according to the Sherwood U.S. Pat. No. 3,407,571 on the gas entry side is equipped with a coating or layering of palladium or palladium-alloy which is to assure a dissociation of the molecular hydrogen into atomic hydrogen.

The entire apparatus operates at a pressure difference between the chambers or spaces on both sides of the membrane amounting to at least 10 psi and preferably 20 to 1500 psi (see the last and next to the last line of column 2 of the Sherwood U.S. Pat. No. 3,407,571).

The essential difference of the present invention comprises or now exists therein that, compared with the U.S. Pat. No. 3,407,571-Sherwood, no palladium coating or layering is provided (which would even be damaging or detrimental), but rather the present invention provides an apparatus preferably to be operated electrically independently of the wall for creation or generation of atomic hydrogen from hydrogen compounds. Examples for such devices are set forth in the present inventive disclosure; these examples are based upon a dissociation at high temperature (above 1500° K.) or by glow-discharge or high frequency discharge or also ionizing radiation. The device is to be electrically operated since atomic hydrogen for instance also can be created or generated by ionizing radiation (in other words without electrical connections).

For the purpose of distinguishing as clearly as possible over the previously known apparatus which predominantly operates with membranes of palladium or palladium alloying or at least operating with a coating or layering of palladium or palladium alloys there would be desirable and purposeful to define that in accordance with the present invention a separating wall or membrane is used comprising a material which differs from palladium.

With the present inventive manner of operation with a device independent of the separating wall for creation or generation of atomic hydrogen from hydrogen compounds (such as molecular hydrogen or even methane) next to the side of the separating wall at which the hydrogen-containing gas mixture is supplied as well as with a separating wall being permeable for atomic hydrogen but being permeable only to a lesser extent for molecular hydrogen and consisting of a material different from palladium there is attained in a surprising manner a hydrogen permeation increased by magnitudes (permeation through the separating wall) which is so effective that no driving pressure difference is necessary between the spaces or chambers on both sides of the membrane. Furthermore, to the contrary, a hydrogen-pressure increase can be attained upon the discharge or outlet side of the membrane compared with the inlet or entry side thereof.

Such an unexpected advantageous manner of operation which additionally gets along without the expensive palladium is not in any way shown or suggested by the Sherwood U.S. Pat. No. 3,407,571 and the content of the additionally known prior art are just as ineffective as to the teaching, showing or suggestions thereof.

First of all distinction is made on the basis of the definition of the separating membrane as a material differing from palladium as well as secondly involving the definition of the dissociation-apparatus as an apparatus to be operated preferably electrically independently of the separating membrane or wall such that a recognizable difference exists for the teaching of the present invention even compared with the apparatus of the Sherwood U.S. Pat. No. 3,407,571 considered primarily for purposes of prior art.

U.S. Pat. No. 3,104,960-Chamberlin et al issued in September 1963 shows a device or apparatus with which the separating membrane is made of palladium and with which the tungsten (wolfram) threads within the palladium membrane do not serve for dissociation of the molecular hydrogen by rather only being provided as a heating element for heating up the palladium membrane in order to increase the hydrogen permeability thereof. The (membrane) temperatures provided conventionally for increasing the hydrogen permeability of such membranes are known to lie or exist at approximately 400° K. to 800° K.

The temperatures necessary for a successful dissociation of a tungsten (wolfram) thread as provided according to the present invention lie in contrast above 1500° K., accordingly quite apparently outside the range which would be applied or utilized with the apparatus according to the Chamberlin U.S. Pat. No. 3,104,960 in order to heat up the adjacent or adjoining palladium wall to 400° K. to 800° K.

The U.S. Pat. No. 3,251,173-Ehlers et al issued in May 1966 discloses a hydrogen purification or cleansing with which within a cylindrical container a multiplicity of palladium pipes or tubes are provided for discharging or carrying away the hydrogen diffused therethrough and being brought to an increased or elevated temperature by way of a heating element 18 which enhances the hydrogen permeation. There is not apparent at any location that by way of the heating element 18 any dissociation of the molecular hydrogen into atomic hydrogen is to be attained (for which then temperatures above 1500° K. would be necessary). A heating to such high temperature is non-conventional if not especially set forth or mentioned.

By way of limitation as to membranes made of material differing from palladium there is additionally attained also a considerable distinction of the present invention over the state of the art represented by Ehlers et al U.S. Pat. No. 3,251,173.

In the U.S. Pat. No. 2,609,059-Benedict issued in September 1952 there is disclosed a diffusion screen having capillary pores and no solid wall; there may be mentioned that metal such as iron, nickel, copper, platinum, molybdenum as well as alloys thereof differing from palladium are useable as hydrogen permeable membranes. The U.S. Pat. No. 2,609,059 however also prefers palladium since in a thin layer, supported by a porous sinter body palladium is to be used in order to increase the passage or permeability of the hydrogen therethrough. Even though possibly materials as set forth differing from palladium are listed as hydrogen permeable there is respectfully stressed that in the U.S. Pat. No. 2,609,059 in no way is there asserted that a successful hydrogen separation would be possible solely with membranes made of such materials. The practical testing or attempt would also teach that the efficiency of such materials for the hydrogen permeation even at elevated temperatures remains far behind that of palladium.

At first and not until the present inventive combination of the membranes of a material permeable for hydrogen (which according to the desired limitation and distinction should differ from palladium) with a device or apparatus provided upon the hydrogen supply of feeding side for generation of atomic hydrogen leads to an extraordinarily effective hydrogen separation which by far exceeds what up to now was possible according to the previously known proposals.

The content of the U.S. Pat. No. 2,609,059 accordingly does not in any way make obvious the teaching of the present invention.

From the foreign German disclosure 733 079 dated March 1943 there is recognizable a gas separation procedure which in essence is based upon thermo-diffusion which additionally is combined with a diffusion by way of porous walls for increasing the separation effect.

For bringing about the thermo-diffusion, the heating rod 1 is provided inside a cylindrical device or apparatus which is heated to approximately 600° C. (see page 2, left column, line 47 of the German reference 733 079). This central heating rod is accordingly in no way to be considered as a device for creation or generation of atomic hydrogen. Consequently the teaching of the present invention also is not made obvious or met by way of the foreign German disclosure 733 079.

The present disclosure directed to the method and/or apparatus for separation of hydrogen relates to a single invention, namely the separation of hydrogen from a gas mixture supplied from one space or chamber 1 into a space or chamber 2 which is separated from the chamber 1 by a hydrogen atom permeable membrane whereby within the chamber 1 a device or generation or creation of atomic hydrogen is provided independently of the membrane.

According to the method or procedure of Sherwood U.S. Pat. No. 3,407,571, a separating wall is used for the separation of hydrogen from gas mixtures and this separating wall must be coated or plated with palladium on the side of the gas mixture. This palladium layer is to assure for the dissociation of hydrogen molecules into atomic hydrogen which then passes through the wall (for example in steel) located therebelow and providing a framework therewith.

According to the present invention, in comparison, there is utilized a separating wall which is not to include any palladium and furthermore differing from the Sherwood Patent utilizing a device (as for example particularly a heating coil or spiral) with which molecular hydrogen in the gas chamber is converted into atomic hydrogen.

Through the present invention there is attained a considerable advantage since the hydrogen dissociation in the gas chamber together with the diffusion of atomic hydrogen transpires essentially more efficiently through a corresponding separating membrane than the diffusion of the hydrogen through a wall layered or coated with palladium as provided according to the Sherwood Patent disclosure. More particularly according to the present invention, aside therefrom that expensive palladium is made completely superfluous, there can be operated with a very nominal hydrogen content of the gas mixture which content readily can lie for example at $10^{-5}$ bar, while according to the Sherwood patent disclosure preferably pressure differences between the chamber of the gas mixture and the chamber 2 located behind the separating wall should be applied or utilized having values of approximately 20 to 1500 psi (approximately 1.4 to 200 bar). Additionally according to the present invention there is even attained a predetermined or particular pump effect with the result that the hydrogen pressure in the chamber 2 can be considerably higher than in the chamber 1.

The advantages which are attained according to the present invention at the time of the Sherwood Patent disclosure could have been readily attained if the invention had been obvious since the hydrogen dissociation on a glow wire has been known for a very long time (see I Langmuir, J. Am. Chem. Soc. 34 (1912) 860–77 as well as 37 (1915) 417–58). This possibility of the dissociation of molecular hydrogen also has not in any way been forgotten in the past as apparent from the article of T W Hickmott J. Chem. Phys. 32 issue 3 (1960) 810 etc. about the hydrogen dissociation on glow wires or threads.

The fact that the present invention represents an unobvious idea is strengthened and reinforced additionally thereby that even in more recent times still the arrangement of Sherwood, namely the layering or coating of a non-precious separating wall with palladium is recommended as a possibility for a through-passage of hydrogen (as also apparent from the attached copy of information "Hydrogen in Metals II" by G. Alefeld and J. Volkl, Springer-Verlag, Berlin-Heidelberg-New York, 1978).

Even though the apparatus differences between the invention and the Sherwood Patent disclosure upon cursory consideration only appear to be slight or nominal, there is stressed that the teaching of the present invention has considerable meaning which results therefrom that through the inventive modification there is attained a differing through-passage mechanism which brings about considerable advantages.

For the purpose of making these differences especially clear and definite, reference can be made to an attached photocopy of a schematic diagram(s) comparing the features of the present invention with those of the Sherwood patent disclosure schematically; essential differences and advantages are summarized by this attached photocopy to emphasize the salient points and features of the present invention.

The foregoing explanation sets forth the difference between the present invention and the state of the art, especially as represented by the Sherwood Patent.

To facilitate understanding of the differences, a more simple pictorial illustration is provided to make the differences between the present invention and the prior art even more clear (see attached photocopy of drawing marked in multi-colors to bring out the differences).

From this drawing there is apparent very clearly that according to the present invention a separate source for atomic hydrogen is provided; such separate source can be formed by a glowing or hot wire (heated filament) with a temperature above 1500 K. (or also by a glow discharge or corona discharge). The atomic hydrogen discharging or coming from such a source is absorbed readily by a steel wall, while molecular hydrogen practically is not received or taken up but rather is reflected. The atomic hydrogen passes through or wanders through the wall and behind the wall is recombined again into molecular hydrogen. The defect is extraordinarily intensive and exceeds by far the up-to-now conventional diffusion of hydrogen through a palladium wall or a wall, which has a palladium coating or covering or a layer with a palladium-containing alloy thereon. Molecular hydrogen is absorbed under dissociation on such a palladium wall and wanders or passes through such a wall as atomic hydrogen and then is released again behind the wall and recombined behind the wall into molecular hydrogen.

Consequently, the present invention disclosure is believed to be completely divergent and beside the point to conclude from any possible constructive similarities as to a working or operating manner analagously. The interpretation of the heat winding according to the Sherwood Patent as being identically effective or operative when compared with the present invention source for atomic hydrogen in the form or shape of a glow wire with a temperature above 1300° C. consequently is not permissible and such a belief is possible only if an expert or average man skilled in the art already knows the issue of the present invention and apparently is trying to read the features of the present invention into the disclosure of the Sherwood Patent once having the benefit of hindsight available for doing so. Here however there can be found to be clearly set forth in column 2, line 64 as a maximum temperature of 1500° F. which corresponds to approximately 850° C. Such a temperature would not be sufficient for a source of atomic hydrogen and this is already the maximum temperature set forth while preferably a range of 300° F. to 500° F. should be applied or utilized which means a range of only 150° C. to 260° C.

The present invention is, of course, in no way restricted to the specific disclosure of the specification and drawing, but also encompasses any modifications within the scope of the appended claims.

What is claimed is:

1. A method for separating hydrogen isotopes from a gas mixture containing a hydrogen isotope mixture, which comprises the steps of:
   supplying said gas mixture into a first chamber;
   dissociating molecular bound hydrogen contained in said gas mixture in the gaseous space;
   allowing said dissociated hydrogen to penetrate a permeable wall arranged between said first chamber and a second chamber said wall being permeable for atomic hydrogen and less permeable for molecular hydrogen, and allowing the dissociated hydrogen to recombine to form hydrogen molecules;
   accumulating said hydrogen molecules in said second chamber until a predetermined pressure has been reached, and
   withdrawing said hydrogen molecules from said second chamber.

2. A method according to claim 1 in which the enumerated steps are performed continuously.

3. A method for separating selected hydrogen isotopes from a gas mixture including at least one hydrogen isotope, which method utilizes a first chamber and a second chamber separated by a wall made of a material permeable to hydrogen atoms but impermeable to hydrogen molecules; the method comprising the steps of:

supplying said gas mixture to a space defined between the first chamber and second chamber;

dissociating molecular bound hydrogen to form dissociated hydrogen atoms of a selected isotope in the space defined between the first and second chambers;

separating the dissociated hydrogen atoms from the gas mixture by allowing the dissociated atoms to pass through the wall separating the first and second chambers;

accumulating in the second chamber the hydrogen atoms which have passed through the wall as the hydrogen atoms recombine into molecular hydrogen, and withdrawing from the second chamber the molecular hydrogen formed by recombining the hydrogen atoms.

4. The method of claim 3 wherein the wall is made of a material which is non-catalytic with respect to hydrogen molecules.

5. The method of claim 3 wherein the wall is made of a material selected from the group consisting of iron, steel and nickel.

6. The method of claim 3 wherein the hydrogen molecules are dissociated by a heating device positioned within the space.

7. The method of claim 6 wherein the heating device is a tungstun wire and wherein the dissociation step is performed by heating the tungstun wire to a temperature in excess of about 1500° C.

8. The method of claim 7 wherein the wall is made of a metal which is non-catalytic with respect to hydrogen molecules.

9. The method of claim 3 wherein the pressure in the second chamber is allowed to exceed the pressure in the first chamber during the accumulation step.

10. The method of claim 3 wherein the enumerated steps are performed continuously.

11. An apparatus for separating hydrogen isotopes from a gas mixture to separate isotopes contained in a hydrogen isotope mixture, which apparatus comprises in combination:

a first chamber and second chamber respectively closable by valves and surrounded on all sides by walls, said first chamber being connected with a gas supply line and a gas discharge line;

a partition separating said chambers and consisting of material differing from palladium, at least a portion of said partition being permeable for atomic hydrogen and less permeable for molecular hydrogen, said second chamber being adapted to collect isotope mixture passing through said permeable portion of said partition, and being adapted to be evacuated, the remaining walls of said chambers comprising material which is at most only poorly permeable for hydrogen isotopes; and a device independent of the partition arranged in said first chamber, utilizable for a dissociation of molecular hydrogen in the gaseous space of said chamber.

12. An apparatus in combination according to claim 11, which includes a plurality of such apparatus sequentially connected.

13. An apparatus in combination according to claim 11 in which said apparatus are sequentially connected in cascade fashion.

* * * * *

UNITED STATES PATENT AND TRADEMARK OFFICE
CERTIFICATE OF CORRECTION

PATENT NO. : 4,494,965
DATED : 22 January 1985
INVENTOR(S) : IMRAN ALI-KHAN ET AL It is certified that error appears in the above-identified patent and that said Letters Patent is hereby corrected as shown below:

On the title page, Foreign Application Priority Data should be:

[30] Foreign Application Priority Data

Dec. 18, 1978 [DE] Fed. Rep. of Germany...2854682

Signed and Sealed this

Thirtieth Day of July 1985

[SEAL]

Attest:

DONALD J. QUIGG

Attesting Officer    Acting Commissioner of Patents and Trademarks